United States Patent
Tsuchiya

(10) Patent No.: US 8,509,957 B2
(45) Date of Patent: Aug. 13, 2013

(54) POWER SUPPLY SYSTEM

(75) Inventor: Shizuo Tsuchiya, Gifu (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 13/400,319

(22) Filed: Feb. 20, 2012

(65) Prior Publication Data

US 2012/0277923 A1     Nov. 1, 2012

(30) Foreign Application Priority Data

Feb. 21, 2011    (JP) ................. 2011-034856

(51) Int. Cl.

| | |
|---|---|
| G05B 11/01 | (2006.01) |
| G05B 13/00 | (2006.01) |
| G05B 15/00 | (2006.01) |
| G01M 1/38 | (2006.01) |
| G05D 23/00 | (2006.01) |
| G05D 3/12 | (2006.01) |
| G05D 5/00 | (2006.01) |
| G05D 9/00 | (2006.01) |
| G05D 17/00 | (2006.01) |
| G01R 11/56 | (2006.01) |
| G01R 21/133 | (2006.01) |
| G06F 17/00 | (2006.01) |

(52) U.S. Cl.
USPC ............ 700/286; 700/19; 700/276; 700/278; 700/291; 700/295; 705/412

(58) Field of Classification Search
USPC ................. 700/19, 276, 278, 286, 291, 295; 705/412

See application file for complete search history.

(56) References Cited

U.S. PATENT DOCUMENTS

| | | | | |
|---|---|---|---|---|
| 8,024,073 | B2 * | 9/2011 | Imes et al. ................. | 700/276 |
| 8,321,296 | B2 * | 11/2012 | Ansari et al. ............. | 705/26.3 |
| 2010/0017045 | A1 | 1/2010 | Nesler et al. | |
| 2011/0055036 | A1 * | 3/2011 | Helfan ...................... | 705/26.1 |
| 2011/0270453 | A1 * | 11/2011 | Kalogridis et al. ........ | 700/291 |
| 2012/0259723 | A1 * | 10/2012 | Ansari et al. ............. | 705/26.3 |
| 2012/0316697 | A1 * | 12/2012 | Boardman et al. ........ | 700/297 |

(Continued)

FOREIGN PATENT DOCUMENTS

| | | |
|---|---|---|
| JP | 05-292674 | 11/1993 |
| JP | 06-38384 | 2/1994 |

(Continued)

OTHER PUBLICATIONS

U.S. Appl. No. 13/372,944, filed Feb. 14, 2012, Tsuchiya.

(Continued)

*Primary Examiner* — Ronald Hartman, Jr.
(74) *Attorney, Agent, or Firm* — Harness, Dickey & Pierce, PLC

(57) ABSTRACT

A power supply system includes a solar power generator, a storage, a controller, a calculator calculating a predicted amount of electricity consumed and a predicted amount of electricity generated, a calculator calculating a shortage amount that is a difference between the predicted amount of electricity consumed and the predicted amount of electricity generated, and a device setting a predicted amount of electricity stored. In a specified time in which electricity cost is lower than in other times, the controller controls such that the storage is supplied with electricity supplied to a building until an amount of electricity stored reaches the predicted amount of electricity stored. In the other times when an amount of solar power generation is larger than an amount of electricity consumed by an electric load, the controller controls such that the storage stores a surplus of the solar electricity.

5 Claims, 5 Drawing Sheets

(56) References Cited

FOREIGN PATENT DOCUMENTS

| | | |
|---|---|---|
| JP | 2002-051481 | 2/2002 |
| JP | 2003-309928 | 10/2003 |
| JP | 2007-295680 | 11/2007 |

OTHER PUBLICATIONS

Office Action dated May 28, 2013 in the corresponding JP application No. 2011-034856 with English translation thereof.

* cited by examiner

POWER SUPPLY SYSTEM

CROSS REFERENCE TO RELATED APPLICATION

This application is based on Japanese Patent Application No. 2011-34856 filed on Feb. 21, 2011, the disclosure of which is incorporated herein by reference.

TECHNICAL FIELD

The present disclosure relates to a power supply system for controlling an amount of electricity stored in an electricity storing device according to an amount of electricity generated by a solar power generating device and an amount of electricity used.

BACKGROUND

In a conventional system including a solar power generating unit and an electricity storing unit, there is provided a method for effectively utilizing electricity generated by a solar power generating unit to reduce an amount of electricity purchased from a commercial power source. In JP-A-2003-309928, there is disclosed a method for activating or stopping an electricity using appliance as needed on the basis of an amount of electricity generated by a solar power generating unit and an amount of electricity supplied from an electricity storing unit, and an amount of electricity used by the electricity using appliance.

In a technology described in this JP-A-2003-309928, there is a case where the electricity using appliance is stopped in order to reduce the amount of the electricity used by the electricity using appliance. In this case, although a user wants to use the electricity using appliance, the electricity using appliance is forcibly stopped, so to speak, which presents a problem of inconvenience.

In contrast to this, in JP-A-2007-295680, there is disclosed a technology of predicting an amount of electricity generated by a solar power generating unit and an amount of electricity consumed to thereby increase an amount of electricity used late at night.

In the technology described in this JP-A-2007-295680, there is a case where because an amount of electricity to be sold (an amount of surplus electricity flowing reversely to a power system) needs to be increased, the use of an electricity using appliance is limited in order to efficiently operate a power conditioner of the solar power generating unit. When the amount of surplus electricity flowing reversely to a power system is given higher priority, it may not be clear whether all of the electricity flowing reversely to the power system is consumed by the other building or is not consumed but is lost due to a transmission resistance. In other words, when the amount of surplus electricity flowing reversely to a power system is increased, solar electricity may not be effectively used.

SUMMARY

In one aspect of the present disclosure, a power supply system is configured to be capable of feeding supply electric power, which is supplied to a building including a wiring and an electric load connected to the wiring by a power system of a power supplier based on a power supply contract, into the electric load. The power supply system includes a solar power generating device, an electricity storing device, a consumption controlling means, a predicted amount calculating means, a shortage amount calculating means, and a storage amount setting means. The solar power generating device is configured to generate solar electric power by solar light. The electricity storing device is connected to the wiring and configured to be capable of storing solar electric power generated by the solar power generating device and supply electric power supplied by the power system and to be capable of discharging the stored electric power into the wiring. The consumption controlling means is for controlling consumption of supply electric power supplied by the power system and for controlling consumption of solar electric power through consumption by storage in the electricity storing device and through consumption by the electric load. The predicted amount calculating means is for calculating a predicted amount of electric power used on a following day by the electric load based on a use record of the electric load, and a predicted amount of electric power generated on the following day by the solar power generating device based on a weather prediction. The shortage amount calculating means is for calculating a shortage amount of electric power, which is a difference between the predicted amount of electric power used and the predicted amount of electric power generated, when the predicted amount of electric power used is larger than the predicted amount of electric power generated. The storage amount setting means is for setting the shortage amount at a predicted storage amount, which is an amount of electric power stored by the electricity storing device after completion of storage of electric power by the electricity storing device, when a limit storage amount, which is an upper limit amount of electric power stored by the electricity storing device, is equal to or higher than the shortage amount, and for setting the limit storage amount at the predicted storage amount when the limit storage amount is smaller than the shortage amount. In a specified time slot determined based on the power supply contract, during which cost of electric power is lower than in other time slots than the specified time slot, the consumption controlling means carries out control such that the electricity storing device stores supply electric power until an amount of electric power stored by the electricity storing device reaches the predicted storage amount. In the other time slots, when an amount of solar electric power generated is larger than an amount of electric power consumed by the electric load, the consumption controlling means carries out control such that the electricity storing device stores a surplus of solar electric power.

In this way, by setting the predicted storage amount by the use of the predicted amount of electric power used and the predicted amount of electric power generated, an amount of electricity stored in the specified time slot can be minimized. This can prevent the electricity that is to be a surplus from being stored in the electricity storing device and hence can further reduce the electricity cost. Further, in a case where the actual amount of electricity generated by the solar power generating device is larger than the predicted amount of electric power generated, or in a case where the actual amount of electricity consumed by the electric load is smaller than the predicted amount of electricity used, the surplus of the amount of electricity generated by the solar power generating device is created. In these cases, the surplus is controlled by the consumption controlling means in such a way that the surplus is charged in the electricity storing device. Thus, even in a case where the surplus of the amount of solar power generation is created, the surplus is not wasted but can be efficiently used. In other words, by the prediction, the amount of solar electric power generated and the amount of electricity by the electricity storing device can be utilized to the maximum in the building and hence the amount of surplus electricity flowing reversely to the power system can be reduced. In the conventional technology, it may be not clear whether all of the electricity flowing reversely to the power system is consumed in other buildings or is not consumed but is lost by a transmission resistance. However, according to the present aspect, it is possible to realize a power supply system capable of effectively utilizing an amount of solar electric power generated by reducing the amount of surplus electricity flowing reversely to the power system.

The power supply system may further include a charging/discharging device that includes a connection terminal part connected to a vehicle. The charging/discharging device is configured to be capable of supplying supply electric power to the vehicle through the connection terminal part, thereby charging an in-vehicle electricity storing unit mounted in the vehicle with supply electric power, and to be capable of discharging the electric power of the in-vehicle electricity storing unit, which is outputted from the vehicle to the connection terminal part, into the wiring. The consumption controlling means may carry out control such that the electric power of the in-vehicle electricity storing unit is discharged into the wiring when a sum of the amount of solar electric power generated and the amount of electric power stored by the electricity storing device is smaller than the amount of electric power consumed by the electric load.

In this way, the power supply system further includes the charging/discharging device that can charge/discharge the in-vehicle electricity storing unit. In the case where the sum of the amount of solar electric power generated and the amount of electricity stored is smaller than the amount of electricity consumed by the electric load, the consumption controlling means controls the in-vehicle electricity storing unit to discharge electricity charged thereto to the wiring. This can activate the electric load by the electricity of the in-vehicle electricity storing unit and hence can inhibit the use of the supply electric power from the power system. This can inhibit an increase in the electricity cost.

The power supply system may further include a storage means and a cumulative total value calculating means. The storage means is for storing a cumulative total value of an amount of electric power discharged into the wiring from the in-vehicle electricity storing unit. The cumulative total value calculating means is for subtracting an amount of electric power, with which the in-vehicle electricity storing unit is charged, from the cumulative total value stored by the storage means every time the in-vehicle electricity storing unit is charged, and for carrying out control such that the cumulative total value after the subtraction is stored in the storage means. In the other time slots, the consumption controlling means charges the in-vehicle electricity storing unit with the surplus of solar electric power in priority to storage of the electricity storing device when the amount of solar electric power generated is larger than the amount of electric power consumed by the electric load and the cumulative total value after the subtraction is larger than 0 (zero).

In this way, in the other time slots, in the case where the cumulative total value is larger than 0, the surplus of the solar electricity is controlled by the consumption controlling means in such a way that the charging of the surplus of the solar electricity to the in-vehicle electricity storing unit is given higher priority than the charging of the surplus of the solar electricity to the electricity storing device. The cumulative total value stored in the storage means is a cumulative total value after the subtraction and becomes a difference between the amount of electricity charged and the amount of electricity discharged until then. By the use of the cumulative total value like this, even if the in-vehicle electricity storing unit is charged in the other place, the cumulative total value can be brought close to 0. This system is a system having a high efficiency in the use of the amount of solar electric power generated, but when the electricity stored in the in-vehicle electricity storing unit is not consumed for the running of the vehicle but is consumed for the building, an amount of carbon dioxide reduced by the running of the vehicle easily becomes unclear. However, by bringing the cumulative total value stored in the storage means close to 0 by the surplus of the amount of solar electric power generated, the consumption of the electricity of the in-vehicle electricity storing unit in the electricity supplied from the power supply system can be collected to the running of the vehicle. Thus, an amount of emission of the carbon dioxide can be made clear.

The power supply system may further include an energy conserving device activated by electric power supplied thereto to store energy. In the other time slots, the consumption controlling means may activate the energy conserving device by the surplus of solar electric power when the amount of solar electric power generated is larger than the amount of electric power consumed by the electric load and the amount of electric power stored by the electricity storing device is equal to or larger than a predetermined set amount.

In this way, in the other time slots, in the case where the amount of solar electric power generated is larger than the amount of electricity consumed by the electric load and where the amount of electricity stored in the electricity storing device is equal to or larger than a specified amount which is set, the energy conserving device is controlled by the consumption controlling means in such a way that the energy conserving device is activated by the surplus of the solar electric power. Thus, the charging of the surplus of the solar electricity to the electricity storing device is given higher priority, and when the amount of electricity stored in the storing device is equal to or larger than a specified amount, the surplus of the solar electric power is consumed by the energy conserving device. Thus, the availability of the surplus of the solar electricity can be improved.

The energy conserving device may be a heat storing device having a heat pump unit. The heat storing device may activate the heat pump unit by electric power supplied to the heat storing device and store an amount of heat as the energy.

In this way, the electricity can be efficiently converted to heat by the heat pump unit. Thus, use efficiency of the solar electric power can be further improved.

BRIEF DESCRIPTION OF THE DRAWINGS

The above and other objects, features, and advantages of the present disclosure will become more apparent from the following detailed description made with reference to the accompanying drawings. In the drawings.

DETAILED DESCRIPTION

Figure 1:
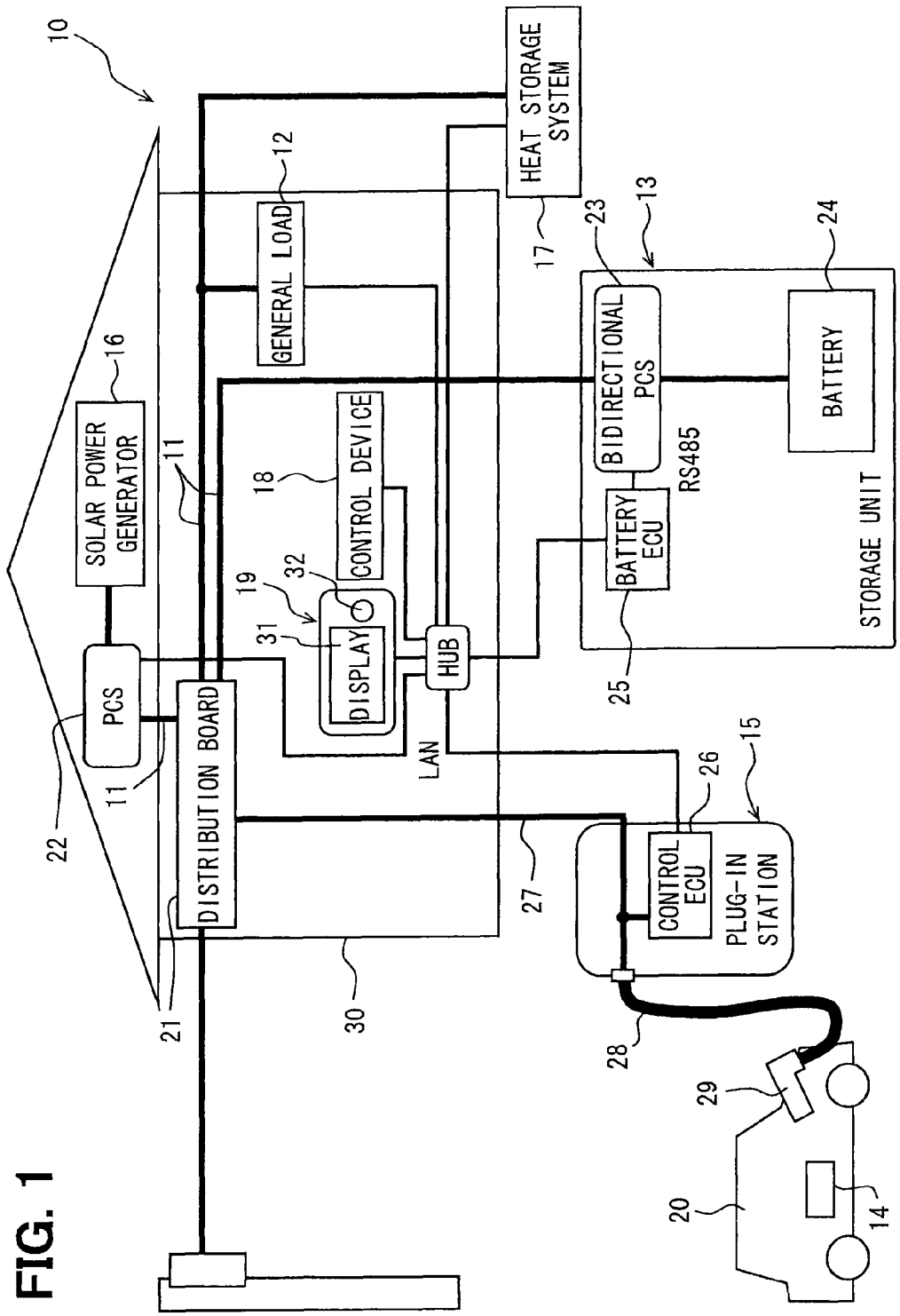
FIG. 1 is a schematic view to show a general construction of a power supply system in an embodiment.

An embodiment of the present disclosure will be described by the use of FIG. 1 to FIG. 7. The power supply system 10 is a system that can supply power, which is supplied from a power system of a power supplier on the basis of a power supply contract, to a general load 12 of an electric load connected to an alternating current (AC) power line 11 in a building 30. In the power supply system 10 of this embodiment, one (single) power supply contract is made in which an electric power cost for a late-night time slot (time slot from 23 o'clock to 7 o'clock) is lower than the electric power cost for the other time slots, and the AC power line 11 for introducing a purchased power (grid power) supplied from a power system of a power company into the building 30 has a time-of-day electric power meter (not shown).

The power supply system 10 includes the AC power line 11 wired in the building 30 that is, for example, a house; an electric storage unit 13 electrically connected to the AC power line 11; an plug-in station 15 for supplying electric power from the AC power line 11 to a vehicle to charge the electric power into an in-vehicle battery 14; a solar power generator 16 for generating electric power by solar light; a heat storage system 17 electrically connected to the AC power line 11; the general load 12 electrically connected to the AC power line 11; a control device 18 for controlling various parts; and an operation display 19 for operating the various parts. The vehicle 20 is a vehicle mounted with an electric storage unit having a comparatively large capacity such as a plug-in hybrid car.

The AC power line 11 wired in the building 30 is, for example, a power line of a single-phase three-wire system (including one neutral line and two voltage lines) and has the grid power of the power system of the power company supplied thereto via a distribution board 21. Although not shown in the drawing, the distribution board 21 is provided with a main breaker and a current breaker that regulates an upper limit of an electric current flowing through the respective circuit systems and that has an electric leakage detection function.

In the distribution board 21, the AC power line 11 is branched into, firstly, the plug-in station 15, secondly, a power conditioner (PCS) 22 for solar power generation, thirdly, a bi-directional PCS 23, and fourthly, the general load 12 and the heat storage system 17.

Firstly, the solar power generator 16 will be described. The solar power generator 16 is a solar power generating device and supplies off-grid power to the AC power line 11. The solar power generator 16 has a solar panel (not shown) arranged on the roof of the building 30 and generates electricity by the use of solar light. The solar power generator 16 supplies the solar electricity generated to the power conditioner (PCS) 22 for solar power generation. The power conditioner (PCS) 22 for solar power generation is electrically connected to the AC power line 11 and converts direct current (DC) power from the solar power generator 16 to AC power and discharges the AC power to the AC power line 11. The power conditioner (PCS) 22 for solar power generation is connected to a local area network (LAN) and is constructed so as to communicate with the respective parts.

Next, the heat storage system 17 will be described. The heat storage system 17 supplied with electricity from the AC power line 11 includes a hot-water storage tank (not shown) for storing, for example, hot water for hot-water supply; a heat pump unit (not shown) for boiling water to make hot water to be stored in the hot-water tank; and a heat storage control section (not shown) for controlling the respective parts. The heat storage control section is constructed so as to be connected to the LAN and to communicate with the respective parts. Here, the heat pump unit corresponds to a heating means and the heat storage system 17 corresponds to a heat storing device that activates the heating means by the supplied electricity to store an amount of heat.

Further, the AC power line 11 for supplying electric power to the heat storage system 17 has also the general load 12 of the respective electric appliances (electric loads) connected thereto. Thus, the AC power line 11 can have the general load 12 connected thereto and hence can supply electricity to the general bad 12.

Next, the electric storage unit 13 will be described. The AC power line 11 has the electric storage unit 13 (also referred to as electric storage system or "e-Station") connected thereto, the electric storage unit 13 being arranged, for example, outside the building 30. The electric storage unit 13 includes a bi-directional power conditioner (PCS) 23, a battery 24, and a battery ECU 25.

The battery 24 is an assembly of a plurality of unit batteries made of secondary batteries such as lithium ion batteries. The battery 24 is electrically connected to the AC power line 11 via the bi-directional PCS 23 and can have AC power charged therein from the AC power line 11 and can discharge the stored DC power to the AC power line 11.

The battery ECU 25 is connected to the bi-directional PCS 23 by a communication line to control the action of the bi-directional PCS 23 by the communication of, for example, communication standards RS. Further, the battery ECU 25 is connected to a battery surveillance ECU (not shown) mounted in the battery 24 via the bi-directional PCS 23 in such a way as to communicate with the battery surveillance ECU. The battery ECU 25 is connected to an operation display 19 and to a control ECU 26 of the plug-in station 15 through the LAN via a hub and hence can exchange information (transmit information) between them.

Next, the plug-in station 15 will be described. The plug-in station 15 is arranged outside the building 30 separately from the electric storage unit 13. To the plug-in station 15 is connected a charging power line 27 branched from the AC power line 11 at the distribution board 21. The charging power line 27 is arranged to the inside of the plug-in station 15 and is connected to a charging/discharging cable 28 extended to the outside from the main body of the plug-in station 15. To an end portion of the charging/discharging cable 28 is fixed a charging/discharging connector 29 corresponding to a connection terminal part. Further, in the plug-in station 15 is arranged a CPLT board (not shown), a PLC (power line communication) unit (not shown), and the control ECU 26. The control ECU 26 communicates with the CPLT board, the PLC unit, the battery ECU 25, and the operation display 19 to thereby control the charging/discharging action of an in-vehicle battery 14 which is an in-vehicle electricity storing unit.

The charging/discharging cable 28 has a CPLT line and a GND line arranged therein together with the power line, thereby communicating a PLT signal. The CPLT board is constructed so as to have the control of charging electricity to the in-vehicle battery 14 as a main function. The CPLT board can communicate with the control ECU 26, for example, through communication standards RS.

The PLC unit is a unit for communicating with the vehicle 20 via a power line in the charging/discharging cable 28. The PLC unit can communicate with the control ECU 26, for example, by UART (universal asynchronous reception-transmission) for making serial communications of asynchronous communication method (non-synchronous system).

The vehicle 20 has a connector (specifically, an outlet of a charging/discharging connector 29). When the charging/discharging connector 29 of the plug-in station 15 is connected to this connector, the in-vehicle battery 14 can be charged or discharged via a vehicle-mounted charging/discharging unit (not shown). When the in-vehicle battery 14 is charged, the AC power is supplied to the connector and the vehicle-mounted charging/discharging unit converts the supplied AC power to DC power and charges the DC power to the in-vehicle battery 14. On the other hand, when the in-vehicle battery 14 is discharged, the vehicle-mounted charging/discharging unit converts the DC power stored in the in-vehicle battery 14 to AC power and discharges the AC power to the charging/discharging connector 29 from the connector.

Next, the operation display 19 will be described. The operation display 19 is, for example, a remote operating means (so-called remote controller) arranged in the building 30. The operation display 19, as described above, is connected to the respective part through the LAN. The operation display 19 has a display part 31 corresponding to a notifying means and an operation switch 32 for operating the respective parts. The display part 31 displays, for example, the charging state of the battery 24, an amount of electricity generated by the solar battery, an amount of hot water (amount of heat) stored by the heat storage system 17, an amount of electricity used by the general load 12, a charging state of the in-vehicle battery 14, and an amount of reverse flow of electricity to the power system. Moreover, when the operation switch 32 is operated, the operation switch 32 can provide an instruction of storing electricity in the battery 24, an instruction of charging electricity to the in-vehicle battery 14, and an instruction of storing hot water to the heat storage system 17, and various settings.

Next, the control device 18 will be described. The control device 18 also has a function as a consumption controlling means for controlling the respective parts. The control device 18, like the operation display 19, is connected to the respective parts through the LAN. The control device 18 provides the respective parts with control instructions to operate the respective parts according to instructions inputted by the operation switch 32 of the operation display 19. Moreover, the control device 18 controls the display part 31 of the operation display 19 so as to display information according to the states of the respective parts.

Although the illustration of the construction of the control device 18 is omitted, the control device 18 includes an input circuit to which a communication signal, detection signals from an atmospheric pressure sensor (not shown) and the like are inputted, a microcomputer for performing various operations by the use of a signal from the input circuit, and an output circuit for outputting a control signal for controlling the respective parts on the basis of the operation performed by the microcomputer. The microcomputer incorporates a ROM (Read-Only Memory, abbreviated as "ROM") and a RAM (Random Access Memory, abbreviated as "RAM") as storage means for storing various data such as atmospheric pressure, operation results, and the like, and has a control program set in advance and a control program to be updated, and performs various processing which will be described later.

The control device 18 has a function as a predicted amount calculating means for calculating a predicted amount of electricity used on the next day by an electric load, which is calculated on the basis of the use record of the electric load, and an predicted amount of electricity generated on the next day by the solar power generator 16, which is predicted on the basis of a weather prediction. The control device 18 predicts the weather of the next day according to the detection value of the atmospheric pressure detected by the atmospheric pressure sensor and calculates the predicted amount of electricity generated, which is an amount of electricity generated on the next day by the solar power generator 16, on the basis of the result of the weather prediction and the record of the amount of electricity generated in the past. Further, the control device 18 also has a function as a shortage amount calculating means for calculating a deficient amount that is a difference between the predicted amount of electricity used and the predicted amount of electricity generated in the case where the predicted amount of electricity used is larger than the predicted amount of electricity generated. Further, the control device 18 has also a function as a storage amount setting means for setting the deficient amount to a predicted amount of electricity stored that is an amount of electricity stored further in the battery 24 after the battery 24 has electricity stored therein in a case where an amount of electricity fully charged that is an upper limit of electricity stored in the battery 24 (a limit amount of electricity stored) is equal to or larger than the deficient amount and for setting the limit amount of electricity stored to a predicted amount of electricity stored in the case where the limit amount of electricity stored is smaller than the deficient amount. Thus, in order to reduce energy and running cost, the control device 18 predicts the weather and predicts an amount of solar power generation in the daytime on the basis of the weather prediction and the like and determines the predicted amount of electricity stored in a late-night time slot in consideration of this amount of solar power generation and the predicted amount of electricity used by the general load 12.

The predicted amount of electricity stored is calculated by subtracting the sum of the amount of electricity stored that remains in the battery 24 and the predicted amount of electricity generated on the next day (a predicted value of the amount of electricity generated) from a learned value based on the result of electricity used in the past by the general load 12 by a user. The control device 18 activates the electric storage unit 13 in the late-night time slot in which an electric rate is low to thereby store electricity in the electric storage unit 13 according to the predicted amount of electricity stored that has been calculated, whereby an amount of electricity newly stored is added to the battery 24.

Further, in the weather prediction operation performed by the control device 18, the amount of solar power generation on the next day is determined on the basis of parameters of the detected atmospheric pressure value, a rate of vibration of the atmospheric pressure value, and a change rate of the atmospheric pressure value. For example, the control device 18 stores a predetermined map used for the weather prediction operation in a storage means. In the map, the rate of vibration of the atmospheric pressure value is classified broadly into two groups, and an inequality relating to the change rate of the atmospheric pressure value is further classified into a plurality of groups for each rate of vibration, and an inequality relating to the atmospheric pressure value is further assigned to each group of the change rate. When the respective parameters of the atmospheric pressure value, the rate of vibration and the change rate are applied to the map, one predicted amount of electricity generated can be determined. As for the atmospheric pressure value, for example, a present detection value of the atmospheric pressure value is used for the operation, and as for the rate of vibration and the change rate, the rate of vibration and the change rate in the past from four hours ago to the present time are used for the operation. Thus, the control device 18 stores a map, which shows a correlation between the atmospheric pressure data in the past and the amount of solar power generation in the past, in the storage means. The control device 18 determines the amount of solar power generation (the predicted amount of electricity generated) on the next day by the use of the map on the basis of the atmospheric pressure. This map can be sequentially effectively updated, for example, by recording the atmospheric pressure in the past and the result of the amount of electricity generated in the past.

Further, the control device 18 controls the storage means in such a way as to store a cumulative total value of the amount of electricity discharged from the in-vehicle battery 14 to the AC power line 11 in the storage means. Still further, the control device 18 has a function as a cumulative total value calculating means and controls the storage means in such a way as to subtract an amount of electricity stored in the in-vehicle battery 14 from the cumulative total value stored in the storage means and to store a cumulative total value after subtraction in the storage means every time electricity is stored in the in-vehicle battery 14. Still further, the control device 18 controls the respective parts in such a way as to give higher priority, for example, to the charging of a surplus of the solar electricity to the in-vehicle battery than to the reverse flow of the surplus of the solar electricity to the power system when the cumulative total value stored in the storage means is larger than 0 in a case where the amount of solar power generation is larger than the electricity used by the general load 12 in the other time slots.

Figure 2:
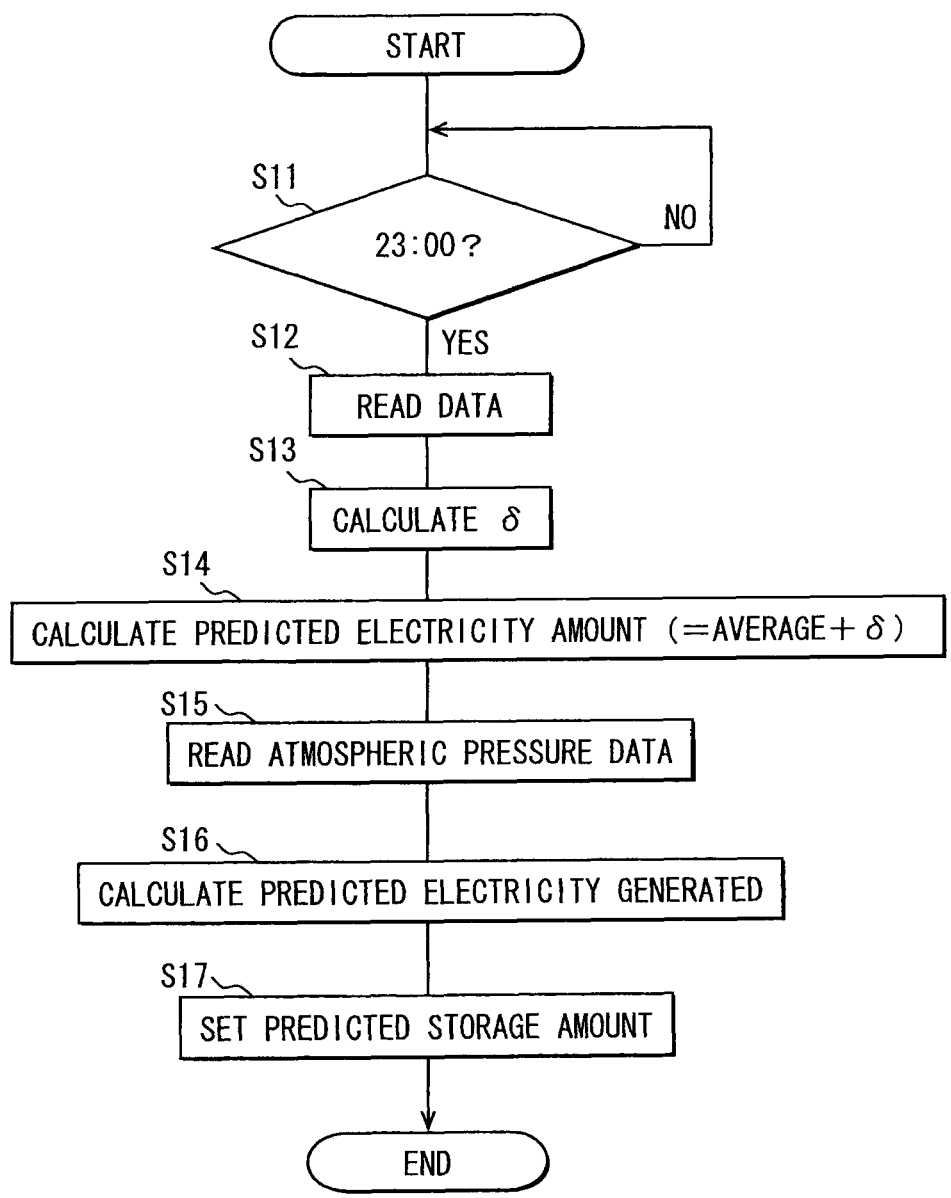
FIG. 2 is a flow chart to show late-night charging processing of a control device in the embodiment.

Next, control performed by the control device 18 will be described. The late-night charging processing is processing of determining an amount of electricity stored in the battery 24 in a late-night time slot. A flow shown in FIG. 2 is performed in a state where the control device 18 is supplied with power.

When the flow is started, in step S11, it is determined whether or not the present time is 23 o'clock. If the present time is 23 o'clock, the flow proceeds to step S12, and if the present time is not 23 o'clock, the processing of step S11 is repeated.

In step S12 is performed reading processing of reading data stored in the storage means, for example, the amount of electricity used in the past by the general load 12 and the amount of solar power generation in the past, and then the flow proceeds to step S13. A past record is a record of a predetermined number of days in the past (for example, a record of 14 days) and includes two kinds of data of a record of weekdays and a record of holidays (Saturday and Sunday). When the data is read, one kind of data is selected according to the day of the week.

In step S13, a deviation δ of the amount of electricity used is calculated on the basis of the read record of the amount of electricity used, and then the flow proceeds to step S14. In step S14, the sum of an average value of the amount of electricity used and the calculated deviation δ is set to a predicted amount of electricity used on the next day, and then the flow proceeds to step S15. Thus, the predicted amount of electricity used becomes a value obtained by adding the deviation δ to the average value of the amount of electricity used by the use of the record of the amount of electricity used.

In step S15, the atmospheric pressure data stored in the storage means is read, and then the flow proceeds to step S16. The atmospheric pressure data is stored in the storage means and all of the atmospheric pressure data from the present time to 4 hours ago is read. Here, although a time width of 4 hours is assumed in step S15, the time width is not always limited to this but all of the atmospheric pressure data of a predetermined time width may be read in this step.

In step S16, the amount of solar power generation on the next day is calculated on the basis of the atmospheric pressure date, and then the flow proceeds to step S17. In step S16, one predicted amount of electricity generated is determined by applying the respective parameters of the atmospheric pressure value, the rate of vibration of the atmospheric pressure value, and the change rate of the atmospheric pressure value, those of which have been read, by the use of a correlation map between the atmospheric pressure and the amount of solar power generation which are stored in the storage means.

In step S17, the predicted amount of electricity stored is determined on the basis of the predicted amount of electricity used and the predicted amount of electricity generated, and this flow is ended. In order to determine the predicted amount of electricity stored, as described above, firstly, the deficient amount is calculated. When the predicted amount of electricity used is larger than the predicted amount of electricity generated, the deficient amount is calculated by the difference between the predicted amount of electricity used and the predicted amount of electricity generated. Next, in the case where the limit amount of electricity stored of the battery 24 is larger than the deficient amount, the deficient amount is set to the predicted amount of electricity stored, and in the case where the limit amount of electricity stored is smaller than the deficient amount, the limit amount of electricity stored is set to the predicted amount of electricity stored.

By this late-night charging processing, the predicted amount of electricity stored is set as the amount of electricity stored that is to be stored in the late-night time slot. In this way, the control device 18 controls the respective parts in such a way that the amount of electricity stored becomes the predicted amount of electricity stored in the late-night time slot. Further, although this flow is processing performed at 23 o'clock, the weather prediction can change continuously. Hence, it is acceptable to perform this flow periodically in the late-night time slot and to update and set the predicted amount of electricity stored if necessary.

Figure 3:
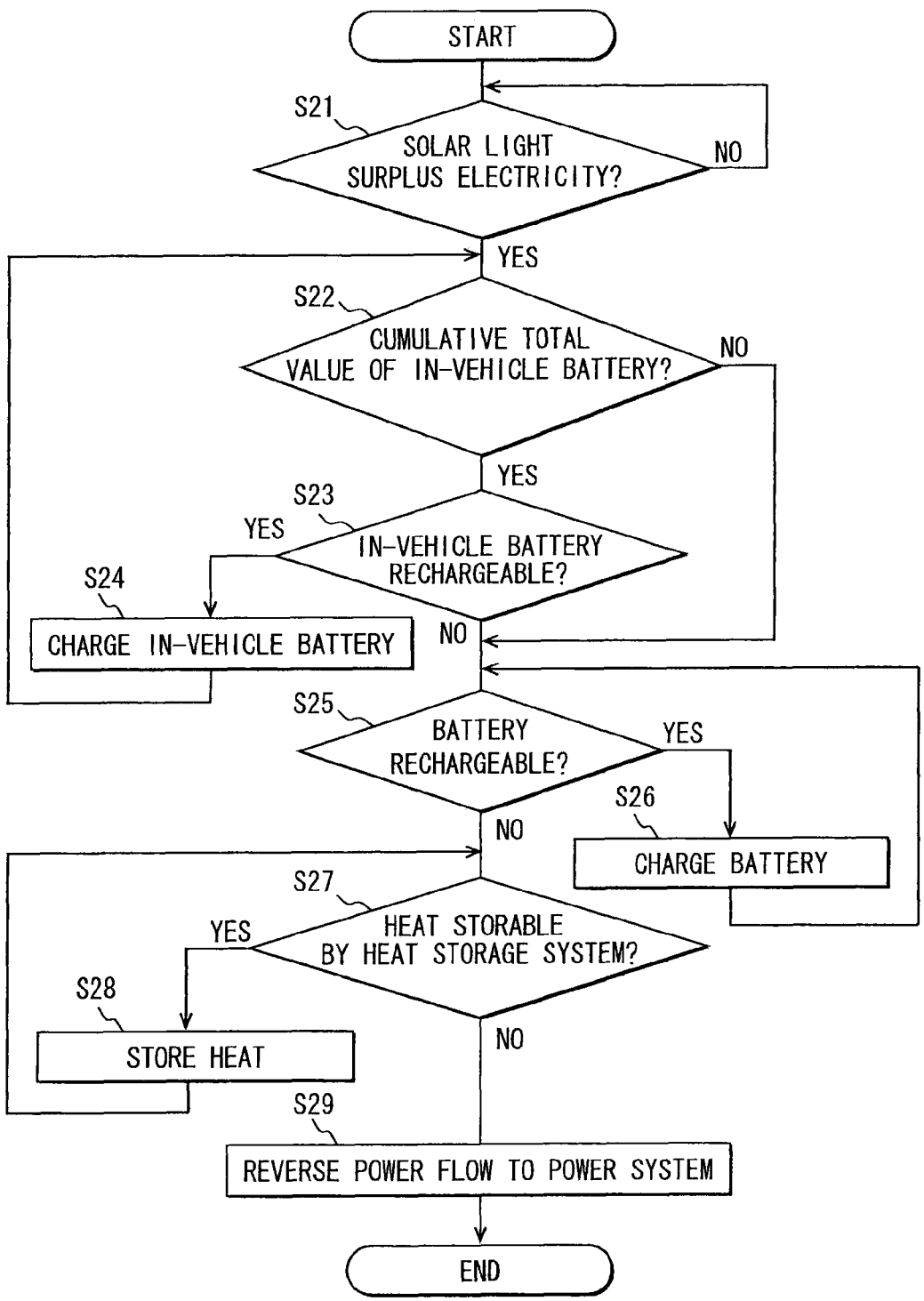
FIG. 3 is a flow chart to show surplus electricity processing of the control device in the embodiment.

Next, control performed in a daytime slot (for example, from 9 o'clock to 17 o'clock) by the control device 18 will be described. The surplus electricity processing is processing of determining how the surplus electricity is consumed in the case where the amount of solar power generation is surplus in the daytime slot. A flow shown in FIG. 3 is performed in the state where the control device 18 is supplied with electric power.

When the flow is started, in step S21, it is determined on the basis of the amount of electricity used and the amount of solar power generation whether or not the amount of solar power generation is surplus (has surplus electricity). If the amount of solar power generation is surplus, the flow proceeds to step S22, and if the amount of solar power generation is not surplus, the processing in step S21 is repeated. The surplus electricity of the amount of solar power generation is, for example, the surplus of the amount of solar power generation in the case where the amount of solar power generation is larger than a value obtained by subtracting an amount of electricity supplied to the AC power line 11 from the battery 24 from the amount of electricity used by the general load 12.

In step S22, because the amount of solar power generation is a surplus, it is determined whether or not the cumulative total value remains in the in-vehicle battery 14 (that is, the cumulative total value is larger than 0). If the cumulative total value remains in the in-vehicle battery 14, the flow proceeds to step S23, and if the cumulative total value does not remain in the in-vehicle battery 14, the flow proceeds to step S25. The cumulative total value is stored in the storage means, as described above, and is a value to show a difference between an amount of electricity discharged to the AC power line 11 and an amount of electricity charged from the AC power line 11. If the cumulative total value stored in the storage means is larger than 0, it means that the amount of electricity discharged is larger than the amount of electricity charged.

In step S23, it is determined whether or not the in-vehicle battery 14 can be charged. If the in-vehicle battery 14 can be charged, the flow proceeds to step S24, and if the in-vehicle 14 cannot be charged, the flow proceeds to step S25. In step S24, because the cumulative total value is not 0 and the in-vehicle battery 14 can be charged, the in-vehicle battery 14 is charged by the use of the surplus electricity and the processing from step S22 to step S24 is repeated until there is brought about a state in which the in-vehicle battery 14 cannot be charged. A case where the in-vehicle battery 14 cannot be charged includes, for example, a case where the in-vehicle battery 14 is fully charged (reaches a limit amount of electricity charged), a case where the in-vehicle battery 14 is not connected, and a case where the in-vehicle battery 14 is set not to be charged.

In step S25, because the in-vehicle battery 14 cannot be charged or the cumulative total value is 0, it is determined whether or not the battery 24 can be charged. If the battery 24 cannot be charged, the flow proceeds to step S27, and if the battery 24 can be charged, the flow proceeds step S26. A case where the battery 24 cannot be charged includes, for example, a case where the battery 24 is fully charged (reaches a limit amount of electricity charged), and a case where the battery 24 is set not to be charged. In step S26, because the battery 24 can be charged, the battery 24 can be charged by the use of the surplus electricity and the processing of step S25 and step S26 is repeated until there is brought about a state in which the battery 24 cannot be charged.

In step S27, because the battery 24 cannot be charged, it is determined whether or not heat can be stored by the heat storage system 17. If heat can be stored by the heat storage system 17, the flow proceeds to step S28, and if heat cannot be stored by the heat storage system 17, the flow proceeds to step S29. Whether or not heat can be stored by the heat storage system 17 is determined by whether or not an amount of hot water stored in the hot-water storage tank is a maximum amount of hot water stored. If the amount of hot water stored in the hot-water storage tank is not a maximum amount of hot water stored, the heat can be stored to the maximum amount of hot water stored. In step S27, because heat can be stored by the heat storage system 17, the heat pump unit is activated by the use of the surplus electricity to store heat and the processing of step 27 and step 28 is repeated until an amount of heat stored becomes the maximum amount of hot water stored.

In step S29, because a unit of consuming the surplus electricity (storing electricity or heat) is not in the power supply system 10, the surplus electricity is controlled in such a way that the surplus electricity flows reversely to the power system, thereby being sold, and then the flow is ended.

By this surplus electricity processing, the surplus electricity is sequentially stored as electricity or heat in the in-vehicle battery 14, the battery 24, or the heat storage system 17. Thus, the storage of the surplus electricity in the battery 24 is given higher priority than the storage of surplus electricity in the heat storage system 17. That is, when the battery 24 reaches a limit amount of electricity charged, which is equal to or larger than a specified amount, the surplus electricity is stored as heat in the heat storage system 17. This order is not always limited to the flow shown in FIG. 3 but can be appropriately set by the user. For example, in the case where it is set that the storage of the surplus electricity in the heat storage system 17 is given higher priority, the surplus electricity is consumed first in the heat storage system 17. Thus, of the surplus electricity by the solar power generation, an amount of electricity flowing reversely to the power system can be made as small as possible. Further, for example, in a case where it is set that the reverse flow of the surplus electricity to the power system is given higher priority, if it is determined in step S21 that the surplus electricity is there, the flow is made to proceed to step S29, whereby the reverse flow of the surplus electricity to the power system is given higher priority and hence the surplus electricity can flow reversely to the power system.

Figure 4:
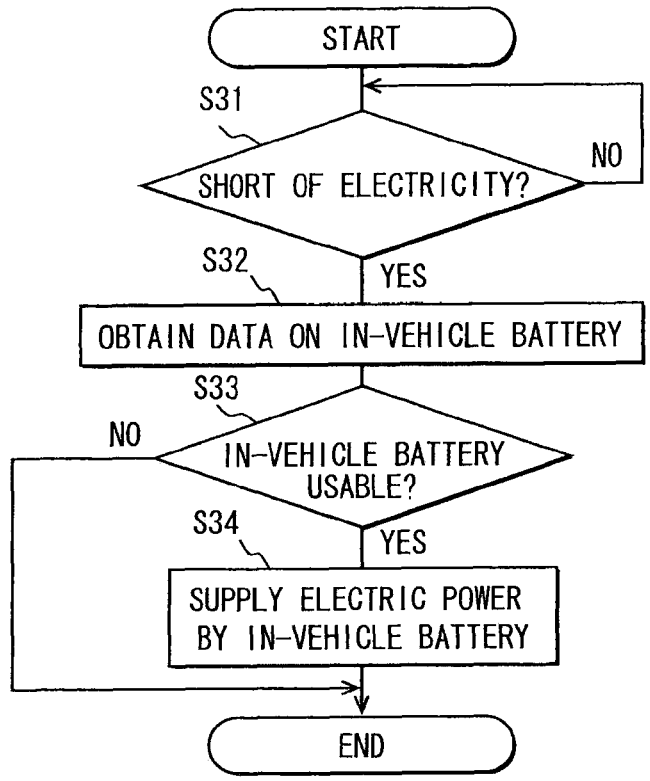
FIG. 4 is a flow chart to show electricity shortage processing of a control device in the embodiment.

Next, other processing performed in the daytime slot by the control device 18 will be described. The power shortage processing is processing in a case where the amount of solar power generation is small in the daytime slot and where the amount of electricity stored in the battery 24 also becomes small. A flow shown in FIG. 4 is performed in a state where the control device 18 is supplied with power.

When the flow is started, in step S31, it is determined whether or not the electricity is short in supply because the electricity is consumed by the general load 12. If it is determined that the electricity is short in supply, the flow proceeds to step S32, and if it is determined that the electricity is not short in supply, the processing in step S31 is repeated. A state where the electricity is short in supply is caused in a case where the electricity from the power system is not used and where, for example, the amount of electricity stored in the battery 24 is short, the amount of solar power generation is small, or the amount of electricity used by the general load 12 is large.

In step S32, because the electricity in the AC power line 11 is short in supply, the data of the in-vehicle battery 14 is acquired and the flow proceeds to step S33. The data of the in-vehicle battery 14 includes, for example, whether or not the in-vehicle battery 14 is connected to the AC power line 11, the running plan of the vehicle, and the amount of electricity charged.

In step S33, it is determined on the basis of the acquired data whether or not the in-vehicle battery 14 can be used. If it is determined that the in-vehicle battery 14 can be used, the flow proceeds to step S34, whereas if it is determined that the in-vehicle battery 14 cannot be used, the flow is ended. A case where the in-vehicle battery 14 can be used includes, for example, a case where the amount of electricity charged is sufficient, a case where there is not the running plan of the vehicle, and a case where it is set that the electricity can be discharged. A case where the in-vehicle battery 14 cannot be used includes, for example, a case where the in-vehicle battery 14 is not connected to the AC power line 11, a case where the time when the vehicle starts to run is set at the nearest time, and a case where it is previously set that the electricity cannot be discharged.

In step S34, because the in-vehicle battery 14 can be used, the in-vehicle battery 14 is controlled to discharge electricity to thereby supply the electricity to the AC power line 11, and then the flow is ended. Further, if the in-vehicle battery 14 cannot be used, the electricity is short in supply, so that the electricity is automatically supplied by the supply power from the power system.

By the power shortage processing like this, in the case where the electricity is short in supply, the in-vehicle battery 14 can be used as a backup power supply source. In this way, the amount of electricity supplied from the power system can be reduced.

Figure 5:
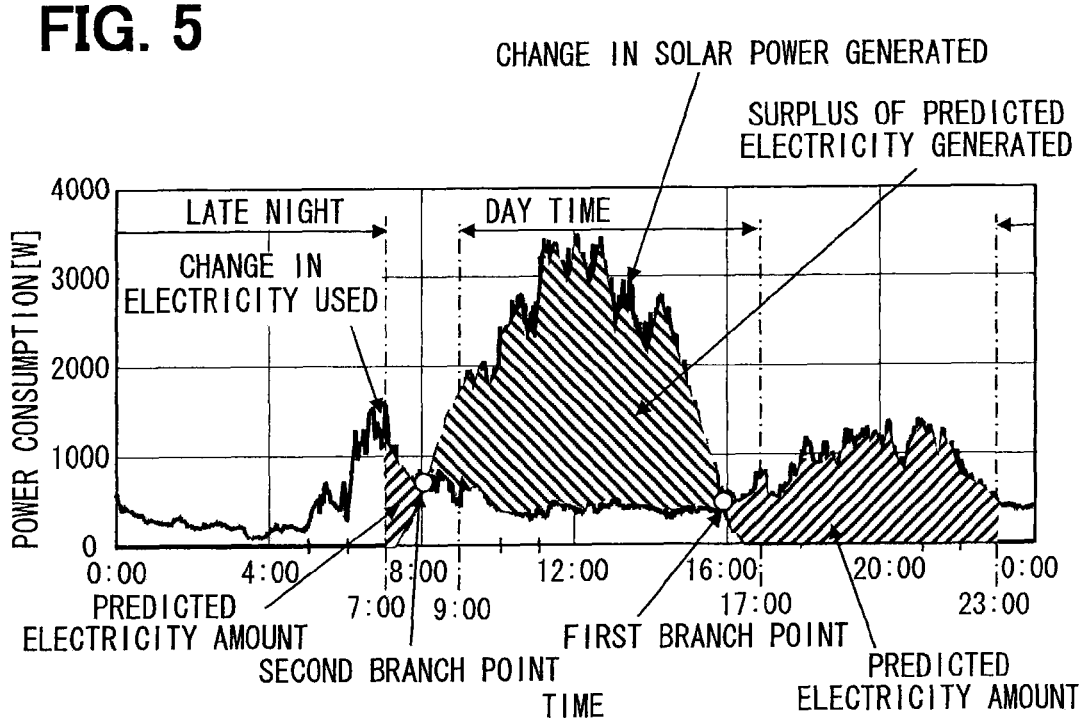
FIG. 5 is a graph to show a first example of a relationship between power consumption and time on a next day in the embodiment.

Next, a relationship between power consumption in the general load 12 and time will be described with reference to FIG. 5 to FIG. 7. The example shown in FIG. 5 is an example in the case where it is predicted that in the daytime slot the amount of solar power generation is large and that the electricity used (power consumption) in the general load 12 is small. First, the electricity from 7 o'clock when the late-night time slot is ended to a second branch point (8 o'clock) where the amount of solar power generation is larger than the amount of electricity used is stored previously in the late-night time slot in the previous day on the basis of the predicted amount of electricity used. Because the amount of solar power generation is a surplus in the daytime slot (shown in an area hatched diagonally right down), as described above, the surplus electricity is stored in the battery 24. From a first branch point (16 o'clock) where the amount of solar power generation is smaller than the amount of electricity used, the electricity stored in the battery 24 is used. In this case, because the surplus electricity is larger than the predicted amount of electricity used, the electricity stored in the battery 24 can be used from 16 o'clock to 23 o'clock when the late-night time slot starts. Thus, in the example shown in FIG. 5, the predicted amount of electricity used (shown in an area hatched diagonally right up) can be covered by the battery 24.

Figure 6:
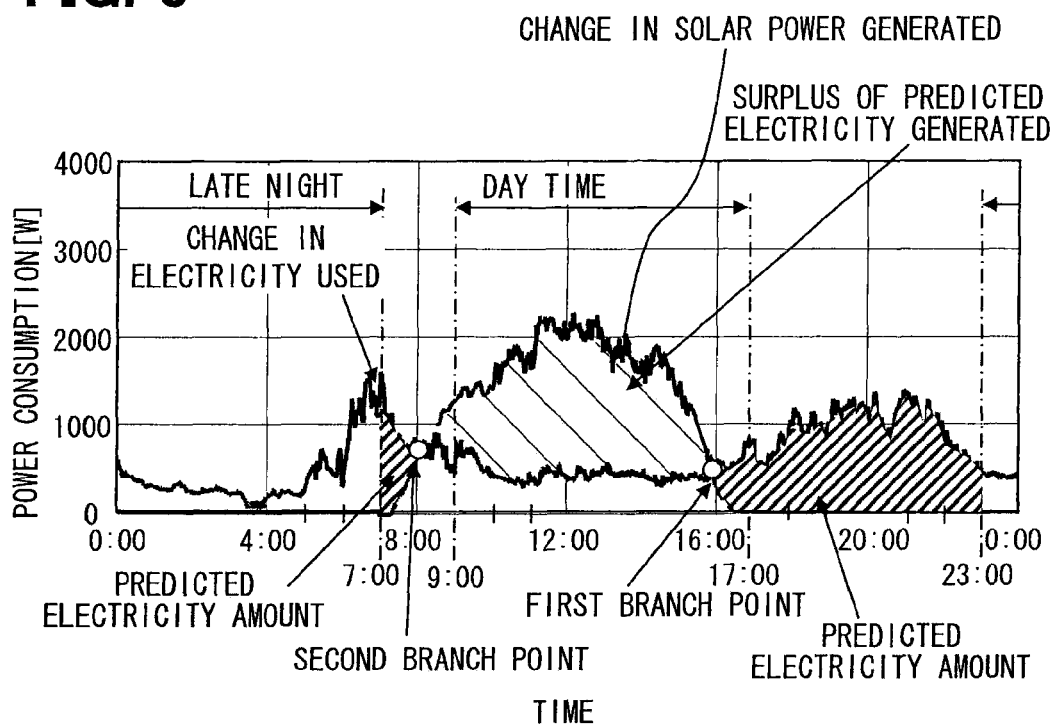
FIG. 6 is a graph to show a second example of a relationship between power consumption and time on the next day in the embodiment.

The example shown in FIG. 6 is an example in the case where it is predicted that the amount of solar power generation is a little smaller in the daytime slot than in the first example. First, the electricity from 7 o'clock when the late-night time slot is ended to the second branch point (8 o'clock) where the amount of solar power generation is larger than the amount of electricity used, as in the case of the first example, is stored previously in the late-night time slot in the previous day. Because the amount of solar power generation is a surplus in the daytime slot, as described above, the surplus electricity is stored in the battery 24. From the first branch point (16 o'clock) where the amount of solar power generation is smaller than the amount of electricity used, the electricity stored in the battery 24 is used. In this example, the surplus electricity is equal to or smaller than the predicted amount of electricity used and hence the electricity is short in supply, but the amount of electricity that is short in supply is an electrically storable amount. In this case, the amount of electricity that is short in supply is stored by the battery 24 in the late-night time slot in the previous day. In this way, the electricity stored in the battery 24 can be used from 16 o'clock to 23 o'clock when the late-night time slot starts on the next day. Thus, in the example shown in FIG. 6, the predicted amount of electricity used can be covered by the battery 24.

Figure 7:
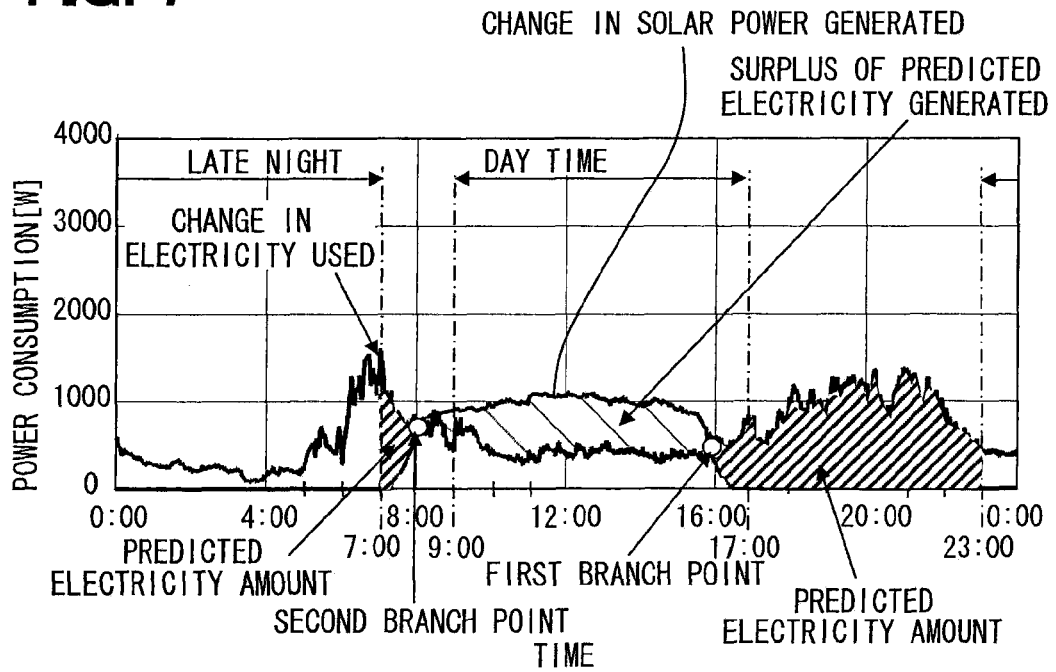
FIG. 7 is a graph to show a third example of a relationship between power consumption and time on the next day in the embodiment.

The example shown in FIG. 7 is an example in the case where it is predicted that the amount of solar power generation is further smaller in the daytime slot than in the second example. First, the electricity from 7 o'clock when the late-night time slot ends to the second branch point (8 o'clock) where the amount of solar power generation is larger than the amount of electricity used, as in the case of the first example, is stored previously in the late-night time slot in the previous day. Because the amount of solar power generation is surplus in the daytime slot, as described above, the surplus electricity is stored in the battery 24. From the first branch point (16 o'clock) where the amount of solar power generation is smaller than the amount of electricity used, the electricity stored in the battery 24 is used. In this example, the surplus electricity is smaller than the predicted amount of electricity used and hence the electricity is short in supply and further the amount of electricity stored is smaller, so that all of the predicted amount of electricity used cannot be stored and the electricity that is short in supply is larger than the electrically storable amount. In this case, the electricity that is short in supply, as shown in FIG. 4, is covered by the electricity discharged from the in-vehicle battery 14 or by the grid power.

As described above, in the power supply system 10 of this embodiment, as shown in FIG. 2, by setting the predicted amount of electricity stored is set by the use of the predicted amount of electricity used and the predicted amount of electricity generated, the amount of electricity stored in the late-night time slot of a specified time slot can be minimized. This can prevent the electricity that becomes surplus from being stored in the battery 24 and hence can further reduce the power cost.

Further, in a case where the actual amount of electricity generated by the solar power generator 16 is larger than the predicted amount of electricity generated, or in a case where the actual power consumption of the general load 12 is smaller than the predicted amount of electricity used, the amount of electricity generated by the solar power generator 16 is a surplus. In this case, a control of making the surplus electricity store in the battery 24 is performed by the control device 18 that is a consumption controlling means. Thus, even if the solar power generation happens to be a surplus, the surplus electricity is not wasted but can be efficiently used. In other words, by prediction, the amount of solar power generation and the electricity supplied by the battery 24 can be used to the utmost extent by the building 30 and hence the amount of electricity flowing reversely to the power system can be reduced. In the related art, it is not clear that all amount of reverse flow of electricity to the power system is consumed in other buildings or the like or that the amount of reverse flow of electricity to the power system is not consumed but is lost by a transmission resistance. However, according to the present power supply system 10, it is possible to realize a power supply system capable of effectively utilizing the amount of solar power generation by reducing the amount of reverse flow of electricity to the power system.

Further, this embodiment further includes the plug-in station 15 that is a charging/discharging device capable of charging/discharging the in-vehicle battery 14. In a case where the sum of the amount of solar power generation and the amount of electricity stored is smaller than the electricity consumed (the amount of electricity used) by the general load 12 of the electric load, the control device 18 controls the in-vehicle battery 14 in such a way as to discharge the electricity stored in the in-vehicle battery 14 to the wiring (see FIG. 4). In this way, the general load 12 can be activated by the electricity of the in-vehicle battery 14, which can thus prevent the use of the supply electricity from the power system. Thus, this can prevent an increase in the power cost.

Further, in this embodiment, in a case where the cumulative total value is larger than 0 in the other time slots, the respective parts are controlled by the control device 18 in such a way that the charging of the surplus of the solar electricity to the in-vehicle battery 14 is given higher priority than the reverse flow of the surplus of the solar electricity to the power system (see step S22 in FIG. 3). The cumulative total value of the amount of electricity discharged, which is stored in the storage means, becomes a difference between the amount of electricity charged and the amount of electricity discharged up to this time. Even if the in-vehicle battery 14 is charged at another place, the cumulative total value can be brought close to 0 by the use of this cumulative total value. The present power supply system 10 is a system having a higher use efficiency of the amount of solar power generation as described above, but when the amount of electricity stored in the in-vehicle battery 14 is not used for the running of the vehicle 20 but is consumed in the building 30, the amount of carbon dioxide reduced by the running of the vehicle 20 easily becomes unclear. However, by bringing the cumulative total value close to 0 by the surplus electricity of the amount of solar power generation, the power consumption of the in-vehicle battery 14 in the power supplied from the power supply system 10 can be collected to the running of the vehicle 20. Thus, the emission of carbon dioxide can be made clearer.

Further, in this embodiment, in the other time slots, in the case where the amount of solar power generation is larger than the amount of electricity consumed (the amount of electricity used) by the general load 12 and where an amount of electricity stored in the battery 24 is larger than a specified amount, for example, a maximum amount of electricity stored, the heat storage system 17 of the energy conserving device is controlled by the control device 13 in such a way that the heat storage system 17 is activated by the surplus of the solar electricity (see step S27 in FIG. 3). In this way, the surplus of the solar electricity is consumed by the energy conserving device, whereby the amount of electricity flowing reversely to the power system can be further reduced. Thus, the use efficiency of the solar electricity can be further improved.

Up to this point, the embodiment has been described. However, the present disclosure is not limited to the embodiment described above but can be variously modified within a scope not departing from the gist of the present disclosure.

In the embodiment described above, any one of the LAN communication, the RS communication, the UART communication, the PLC communication, and the CPLT communication is used for communication for transmitting information between the respective constructions. However, a communication method is not limited to these methods but a communication method other than the embodiment described above may be employed. Further, the type of communication is not limited to wire communication but wireless communication may also be employed.

In the embodiment described above, the electric storage unit 13 and the plug-in station 15 are separate from each other but may be combined with each other. In a case where the electric storage unit 13 and the plug-in station 15 are separate from each other, the degree of freedom of installation positions of the units can be improved. On the other hand, in a case where the electric storage unit 13 and the plug-in station 15 are combined with each other, the construction can be simplified.

In the embodiment described above, both of the stationary battery 24 and the in-vehicle battery 14 are the secondary batteries, but they are not limited to the secondary batteries. Any electric storage means capable of charging/discharging electricity can be employed: for example, a capacitor or the like can also be employed.

In the embodiment described above, the building 30 is a house but is not limited to a house. The building 30 may be, for example, a store, a factory, or a warehouse.

In the embodiment described above, the energy conserving device is realized by an electric water heater for storing heat (conserving heat). However, the energy conserving device is not limited to the electric water heater but may be other energy conserving means, for example, a residential battery or an assembly of these units.

In the embodiment described above, the specified time slot is the late-night time slot (time slot from 23 o'clock to 7 o'clock). However, the specified time slot is not limited to this time slot but may be changed appropriately by a power supply contract.

In the embodiment described above, the heating means of the electric water heater is a heat pump unit. However, the heating means is not limited to this but may be an electric heater or the like.

In the embodiment described above, the vehicle 20 mounted with the in-vehicle battery 14 is a plug-in hybrid (PHV) car. However, the vehicle 20 is not limited to this but may be an electric car. Further, the vehicle 20 may be any vehicle mounted with a battery and is not limited to a vehicle using electricity, which is stored in a battery, for driving the vehicle itself.

In the embodiment described above, the atmospheric pressure data is acquired by the use of the atmospheric pressure sensor. However, it is also possible to use a connection means connected to the Internet and to acquire the atmospheric pressure data made by the Meteorological Agency and to use this data.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. A power supply system configured to be capable of feeding supply electric power, which is supplied to a building including a wiring and an electric load connected to the wiring by a power system of a power supplier based on a power supply contract, into the electric load, the power supply system comprising:

a solar power generating device configured to generate solar electric power by solar light;

an electricity storing device connected to the wiring and configured to be capable of storing solar electric power generated by the solar power generating device and supply electric power supplied by the power system and to be capable of discharging the stored electric power into the wiring;

a consumption controlling means for controlling consumption of supply electric power supplied by the power system and for controlling consumption of solar electric power through consumption by storage in the electricity storing device and through consumption by the electric load;

a predicted amount calculating means for calculating a predicted amount of electric power used on a following day by the electric load based on a use record of the electric load, and a predicted amount of electric power generated on the following day by the solar power generating device based on a weather prediction;

a shortage amount calculating means for calculating a shortage amount of electric power, which is a difference between the predicted amount of electric power used and the predicted amount of electric power generated, when the predicted amount of electric power used is larger than the predicted amount of electric power generated; and a storage amount setting means for setting the shortage amount at a predicted storage amount, which is an amount of electric power stored by the electricity storing device after completion of storage of electric power by the electricity storing device, when a limit storage amount, which is an upper limit amount of electric power stored by the electricity storing device, is equal to or higher than the shortage amount, and for setting the limit storage amount at the predicted storage amount when the limit storage amount is smaller than the shortage amount, wherein:
- in a specified time slot determined based on the power supply contract, during which cost of electric power is lower than in other time slots than the specified time slot, the consumption controlling means carries out control such that the electricity storing device stores supply electric power until an amount of electric power stored by the electricity storing device reaches the predicted storage amount; and
- in the other time slots, when an amount of solar electric power generated is larger than an amount of electric power consumed by the electric load, the consumption controlling means carries out control such that the electricity storing device stores a surplus of solar electric power.

2. The power supply system according to claim 1, further comprising a charging/discharging device that includes a connection terminal part connected to a vehicle, the charging/discharging device being configured to be capable of supplying supply electric power to the vehicle through the connection terminal part, thereby charging an in-vehicle electricity storing unit mounted in the vehicle with supply electric power, and to be capable of discharging the electric power of the in-vehicle electricity storing unit, which is outputted from the vehicle to the connection terminal part, into the wiring, wherein the consumption controlling means carries out control such that the electric power of the in-vehicle electricity storing unit is discharged into the wiring when a sum of the amount of solar electric power generated and the amount of electric power stored by the electricity storing device is smaller than the amount of electric power consumed by the electric load.

3. The power supply system according to claim 2, further comprising:
- a storage means for storing a cumulative total value of an amount of electric power discharged into the wiring from the in-vehicle electricity storing unit; and
- a cumulative total value calculating means for subtracting an amount of electric power, with which the in-vehicle electricity storing unit is charged, from the cumulative total value stored by the storage means every time the in-vehicle electricity storing unit is charged, and for carrying out control such that the cumulative total value after the subtraction is stored in the storage means, wherein in the other time slots, the consumption controlling means charges the in-vehicle electricity storing unit with the surplus of solar electric power in priority to storage of the electricity storing device when the amount of solar electric power generated is larger than the amount of electric power consumed by the electric load and the cumulative total value after the subtraction is larger than 0 (zero).

4. The power supply system according to claim 1, further comprising an energy conserving device activated by electric power supplied thereto to store energy, wherein in the other time slots, the consumption controlling means activates the energy conserving device by the surplus of solar electric power when the amount of solar electric power generated is larger than the amount of electric power consumed by the electric load and the amount of electric power stored by the electricity storing device is equal to or larger than a predetermined set amount.

5. The power supply system according to claim 4, wherein:
- the energy conserving device is a heat storing device having a heat pump unit; and
- the heat storing device activates the heat pump unit by electric power supplied to the heat storing device and stores an amount of heat as the energy.

* * * * *